(12) United States Patent
Karube et al.

(10) Patent No.: US 7,581,615 B2
(45) Date of Patent: Sep. 1, 2009

(54) SADDLE-RIDE TYPE VEHICLE

(75) Inventors: Shinichi Karube, Saitama (JP); Rei Shioya, Saitama (JP); Masahiro Inoue, Saitama (JP); Yuji Maki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 657 days.

(21) Appl. No.: 11/216,157

(22) Filed: Sep. 1, 2005

(65) Prior Publication Data
US 2006/0048993 A1   Mar. 9, 2006

(30) Foreign Application Priority Data
Sep. 6, 2004   (JP) .............................. 2004-258985

(51) Int. Cl.
*B60K 13/04*   (2006.01)
(52) U.S. Cl. .............................. 180/309; 180/89; 180/2; 180/291; 180/90; 180/6; 180/311; 180/184; 180/296
(58) Field of Classification Search ................. 180/309, 180/89.2, 291, 90.6, 311, 184, 296
See application file for complete search history.

(56) References Cited
U.S. PATENT DOCUMENTS
3,161,252 A * 12/1964 Brown ....................... 180/89.2

| | | | |
|---|---|---|---|
| 6,341,763 B1 * | 1/2002 | Lefebvre | 254/131 |
| 6,591,935 B1 * | 7/2003 | Petley | 180/309 |
| 6,719,084 B2 * | 4/2004 | Kuji et al. | 180/309 |
| 6,755,265 B2 * | 6/2004 | Huntsberger et al. | 180/65.1 |
| 6,994,179 B2 * | 2/2006 | Huntsberger et al. | 180/65.3 |

FOREIGN PATENT DOCUMENTS
JP        05-105159 A     4/1993

* cited by examiner

*Primary Examiner*—Christopher Ellis
*Assistant Examiner*—Cynthia F. Collado
(74) *Attorney, Agent, or Firm*—Birch, Stewart, Kolasch & Birch, LLP

(57) ABSTRACT

An improved saddle-ride type vehicle in which heat radiation of a body is improved while the exterior appearance of the body is enhanced, and an exhaust pipe and a muffler are free from interference from the outside while a hose, a cable and the like are designed to be easily retained in place in a simple structure. A saddle-ride type vehicle provides a side cover disposed on the side of a body frame, a foot board disposed below the side cover and an exhaust pipe extending in the forward and rearward direction of a vehicle body disposed inside the body frame. The exhaust pipe is disposed as viewed laterally so as to be exposed to the exterior through an opening surrounded by an upper slat frame, the side cover and the side plate of a foot board, and the guard member is disposed at the opening.

18 Claims, 12 Drawing Sheets

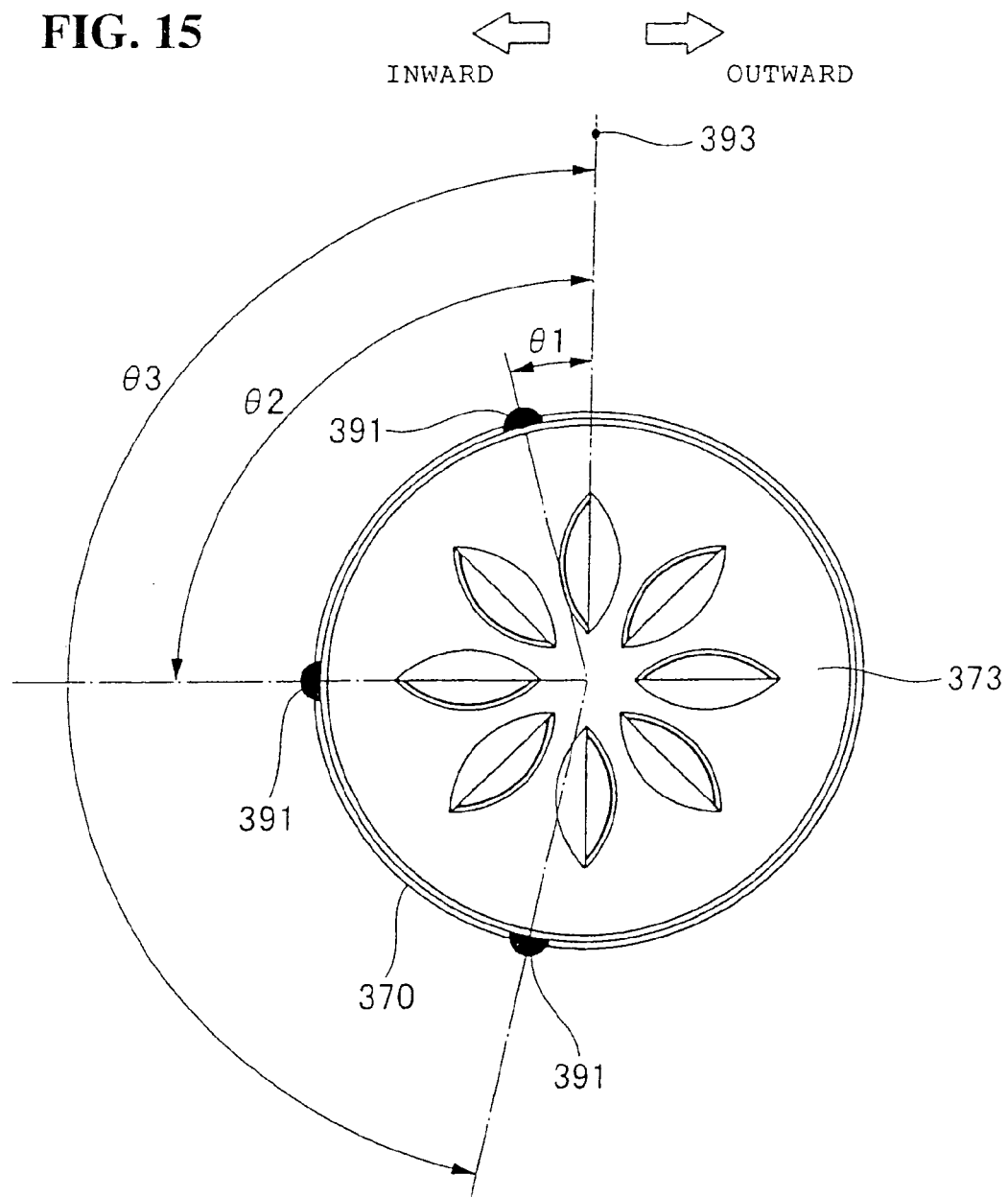

SADDLE-RIDE TYPE VEHICLE

CROSS-REFERENCE TO RELATED APPLICATIONS

The present non-provisional application claims priority under 35 USC 119 to Japanese Patent Application No. 2004-258985 filed on Sep. 6, 2004 the entire contents thereof is hereby incorporated by reference.

BACKGROUND OF THE INVENTION

1. Field of the Invention

The present invention relates to a saddle-ride type vehicle.

2. Description of Background Art

One of the conventional saddle-ride type vehicles known in the art includesa side of a body frame that is covered by a body cover such as a side cover. See, Japanese Patent Laid-Open No. Hei 5-105159. Note that reference numerals described in the document will be used for explanation.

As shown in FIG. 2 of Japanese Patent Laid-Open No. Hei 5-105159, a four-wheeled saddle-ride-type automobile 1 is configured such that a portion disposed laterally forward of a body frame 2 is covered by a side cover 7 and a portion rearward of and obliquely downward of the side cover 7 and laterally downward of a seat 9 is covered by a rear fender 11. More specifically, an extension 11a, and a portion downwardly of the extension 11a is covered by a mud guard 15. A front fender 8 is provided together with an engine 12 that is mounted on the body frame 2. An exhaust pipe 81 and a muffler 80 are mounted relative to the engine 12.

In Japanese Patent Laid-Open No. Hei 5-105159, the major part of the body frame 2 is covered by the body covers such as the side cover 7, the front fender 8, the rear fender 11, the mud guard 15, and the like. Therefore, it is necessary to take into consideration that the heat generated in the engine 12, the exhaust pipe 81, the muffler 80, and the like should be released from inside of the body covers.

For example, to accommodate heat and further to improve the appearance of the saddle-ride type automobile 1, if the body cover is reduced in area, the exhaust pipe 81 and the muffler 80 are exposed to the outside. The exposure of the exhaust pipe 81 and the muffler 80 needs a certain design wherein they are free from interference. More specifically, if another plate-like heat shield cover is attached, it is also needed to allow for radiation of heat within the cover.

In addition, in view of cost and mounting performance, it is desired that, for example, hoses and cables extending in the body frame are easily retained in place in a simple structure so as not to interfere with the exhaust pipe 81 or the muffler 80.

SUMMARY AND OBJECTS OF THE INVENTION

It is an object of the present invention to provide an improved saddle-ride type vehicle in which heat radiation of a body is improved while the exterior appearance of the body is enhanced, and an exhaust pipe and a muffler are prevented from being subjected to interference with the outside while a hose, a cable and the like are designed to be easily retained in place in a simple structure.

An embodiment of the present invention provides a saddle-ride type vehicle in which a side cover is disposed on a side of a body frame, a foot board is disposed below the side cover, and an exhaust pipe extending in the forward and rearward direction of a vehicle body is disposed inside the body frame. The exhaust pipe is disposed as viewed laterally so as to be exposed to the exterior through an opening surrounded by the body frame, the side cover and the foot board, and the guard member is disposed at the opening.

An embodiment of the present invention provides the guard member as a member formed by bending a wire rod.

An embodiment of the present invention provides the guard member as a member adapted to easily retain a cable or a hose thereto.

An embodiment of the present invention provides the guard member as a member that prevents excessive approach to the exhaust pipe through the opening.

An embodiment of the present invention provides an opening wherein the guard member is fixedly attached to the body frame with two fixing parts located forward and rearward thereof in the extending direction of the exhaust pipe, and the guard member between the fixing parts overlaps the exhaust pipe as viewed laterally.

An embodiment of the present invention provides a cable or hose that is disposed on a side opposite to the exhaust pipe with respect to the guard member.

An embodiment of the present invention provides a cable or hose that is used with a rear wheel brake device.

An embodiment of the present invention provides that the guard member is fixedly attached to the body frame for impossible detachment.

In an embodiment of the present invention, since the exhaust pipe is disposed as viewed laterally so as to be exposed to the exterior through an opening surrounded by the body frame, the side cover and the foot board, and the guard member are disposed at the opening, the guard member can allow the exhaust pipe to be free from interference from the outside and heat radiation performance through the opening can be enhanced.

In an embodiment of the present invention, since the guard member is a member formed by bending a wire rod, the heat radiation from the vehicle body is not obstructed, a simple structure is provided, cost is reduced, and assembling performance can be enhanced.

In an embodiment of the present invention, since the guard member is a member adapted to easily retain a cable or a hose thereto, the cable or the hose can be retained so as to be away from the exhaust pipe. In addition, since the guard member also serves as a retaining member for retaining a cable or a hose, an increase in the number of parts can be suppressed to reduce cost.

In an embodiment of the present invention, since the guard member is a member that prevents excessive approach to the exhaust pipe through the opening, the guard member can allow the exhaust pipe to be free from interference from the exterior.

In an embodiment of the present invention, in the opening, the guard member is fixedly attached to the body frame with two fixing parts located forwardly and rearwardly thereof in the extending direction of the exhaust pipe. The guard member between the fixing parts overlaps the exhaust pipe as viewed laterally. Therefore, the guard member can be fixedly secured to the body frame with the two fixing parts located forwardly and rearwardly of the guard member. The guard member between the fixing parts is placed to overlap the exhaust pipe as viewed laterally. This can allow the exhaust pipe to be positively free from interference.

In an embodiment of the present invention, since the cable or the hose is disposed on a side opposite to the exhaust pipe with respect to the guard member, the guard member can prevent the cable or the hose from approaching the exhaust pipe.

In an embodiment of the present invention, since the cable or the hose is used with a rear wheel brake device, the cable or the hose is not liable to be affected by heat from the exhaust pipe, which can maintain the good operation of the drum brake.

In an embodiment of the present invention, since the guard member is fixedly attached to the body frame for impossible detachment, the guard member can surely execute a guarding function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 15 is a cross-sectional view taken along line 15-15 of FIG. 14.

DETAILED DESCRIPTION OF THE PREFERRED EMBODIMENTS

Figure 1:
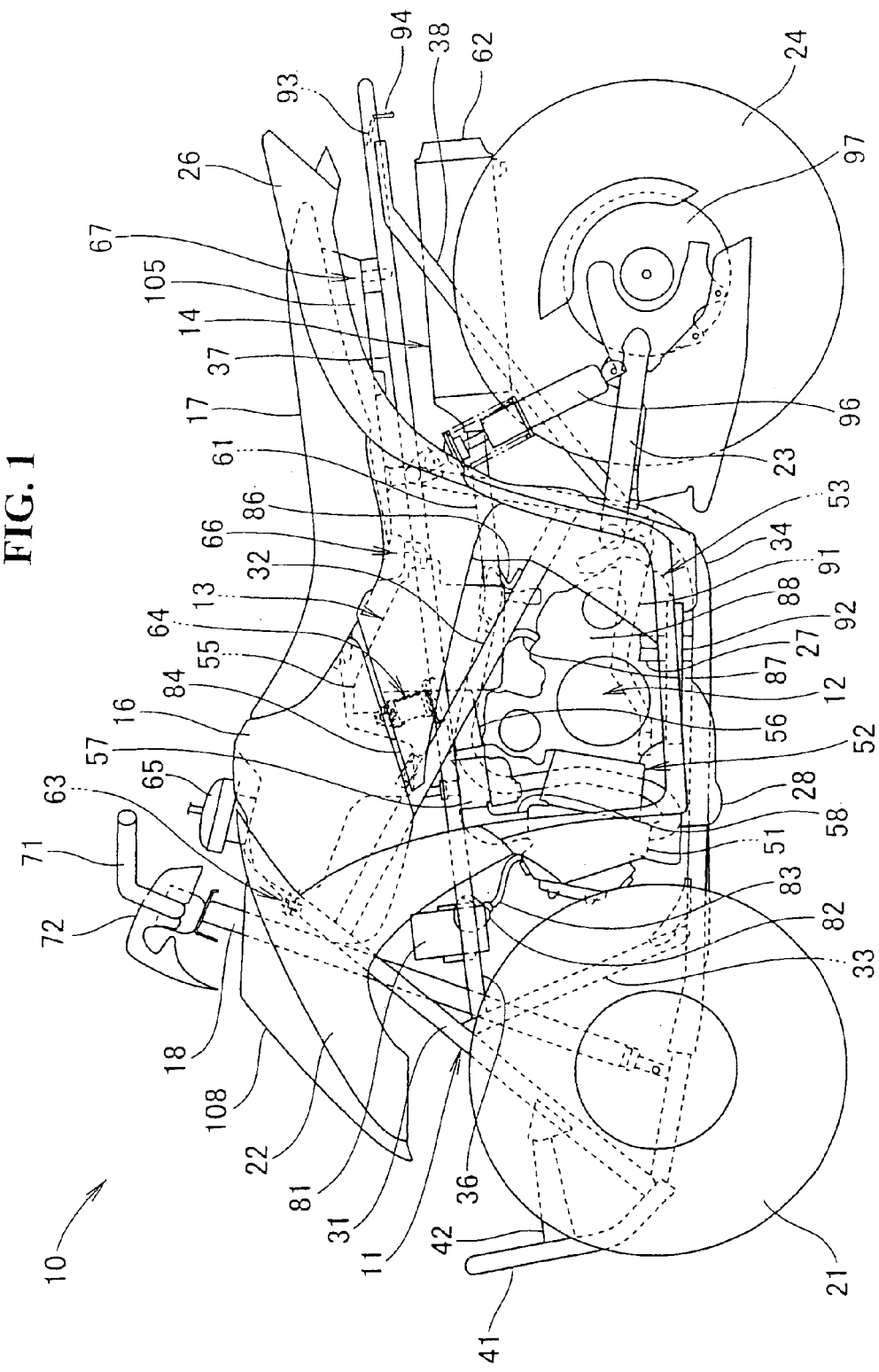
FIG. 1 is a side view of a saddle-ride type vehicle according to the present invention.

Preferred embodiments of invention will be below described with reference to the accompanying drawings. The drawings shall be viewed according to the direction of reference numerals.

FIG. 1 is a side view of a saddle-ride type vehicle according to the present invention. The saddle-ride type vehicle 10 is a small-sized saddle-ride vehicle, which includes a body frame 11 as a framework, a power unit 12 disposed inside the lower portion of the body frame 11, an intake device 13 and an exhaust device 14 connected to the power unit 12. A fuel tank 16 and a seat 17 are mounted on the upper portion of the body frame 11. The vehicle 10 further includes left and right front wheels 21 mounted steerably to the front portion of the body frame 11 through a steering shaft 18, left and right front fenders 22 covering the upper side and rear side of the front wheels 21 and left and right rear wheels 24 mounted vertically movably to the rear lower portion of the body frame 11 through swing arms 23, respectively. In addition, the vehicle 10 includes left and right rear fenders 26 covering the front and upper sides of the rear wheels 24 and left and right foot boards 28 which connect the front fenders 22 with the corresponding rear fenders 26. Footrests 27 is mount on the vehicle 10 for an operator.

The body frame 11 includes a pair of left and right frames including front frames 31, upper slant frames 32 and lower slant frames 33, lower main frames 34, upper front frames 36, upper rear frames 37, and rear slant frame 38. The front frame 31 is inclined such that its upper end is disposed at a position rearwardly of its lower end. The upper slant frame 32 and lower slant frame 33 extend from the middle of the front frame 31 rearwardly and obliquely downwardly. The lower main frame 34 is joined to each of the lower end of the front frame 31 and the rear ends of the upper slant frame 32 and the lower slant frame 33 and includes a rear portion extending upwardly. The upper front frame 36 spans between the upper slant frame 32 and the lower slant frame 33 to connect them and extends rearwardly and slightly upwardly. The upper rear frame 37 extends from the middle of the upper slant frame 32 rearwardly and slightly upwardly, and is joined at its intermediate position to the rear end of the lower main frame 34. The rear slant frame 38 spans between the lower main frame 34 and the upper rear frame 37. These left and right frames are connected to each other by a plurality of corresponding cross members (not shown). In addition, a front bumper frame 41 is provided together with bumper supporting frames 42.

The power unit 12 includes an engine 52 having a cylinder head 51 connected to the intake device 13 and the exhaust device 14 and a transmission 53 provided integrally with the engine 52.

The intake device 13 includes an air cleaner 55 for purifying intake air, a connecting tube 56 attached to the front of the air cleaner 55, a carburetor 57 connected to the front end of the connecting tube 56 and an intake pipe 58 connected to each of the front of the carburetor 57 and the cylinder head 51.

The exhaust device 14 includes an exhaust pipe 61 extending from the cylinder head 51 upwardly and then rearwardly and a muffler 62 joined to the rear end of the exhaust pipe 61.

The fuel tank 16 is a resin-made container, which is mounted at its front portion to the front frame 31 through a front mounting portion 63, and at its bottom portion on the upper rear frames 37 through a pair of left and right bottom mounting portions 64. In addition, a filler cap 65 is provided.

The seat 17 is a component removably mounted on the upper rear frames 37. It is elastically retained to the upper rear frames 37 through a pair of left and right front retaining portions 66, and is positioned and elastically carried by the upper rear frames 37 through a pair of left and right rear positioning portions 67.

The steering shaft 18 is supported at its upper portion by the front frames 31 for rotation and at its lower portion by the lower main frames 34 for rotation. A handlebar 71 is attached to the upper end of the steering shaft 18. A handle cover 72 is mounted thereon.

In FIG. 1, a CDI unit 81 is provided together with an ignition coil 82, a high-voltage cord 83, a side cover 84 molded integrally with the rear fender 26, a guard member 86, and a blow-by hose 87. The guard member 86 is attached to the upper slant frame 32 to cover the right side of the exhaust pipe 61 in relation to the width direction of the vehicle (back side of the paper surface). The blow-by hose 87 is adapted to return a blow-by gas from the inside of the crankcase 88 of the power unit 12 to the air cleaner 55.

In addition, a brake pedal 91 is provided together with left and right foot brackets 92, a pole stay 93, a reflector 94, a rear shock absorber 96, and a drum brake 97. The brake pedal 91 is disposed on the right side of the body frame 11 in relation to the width direction of the vehicle. The foot brackets 92 are attached to the left and right lower main frames 34 to support the left and right foot boards 28, respectively. The pole stay 93 is attached to the rear end of the upper rear frame 37 for mounting a pole. The reflector 94 is attached to the lower portion of the pole stay 93. The drum brake 97 is mounted to the rear end of the swing arm 23 to brake the rear wheels 24.

Figure 2:
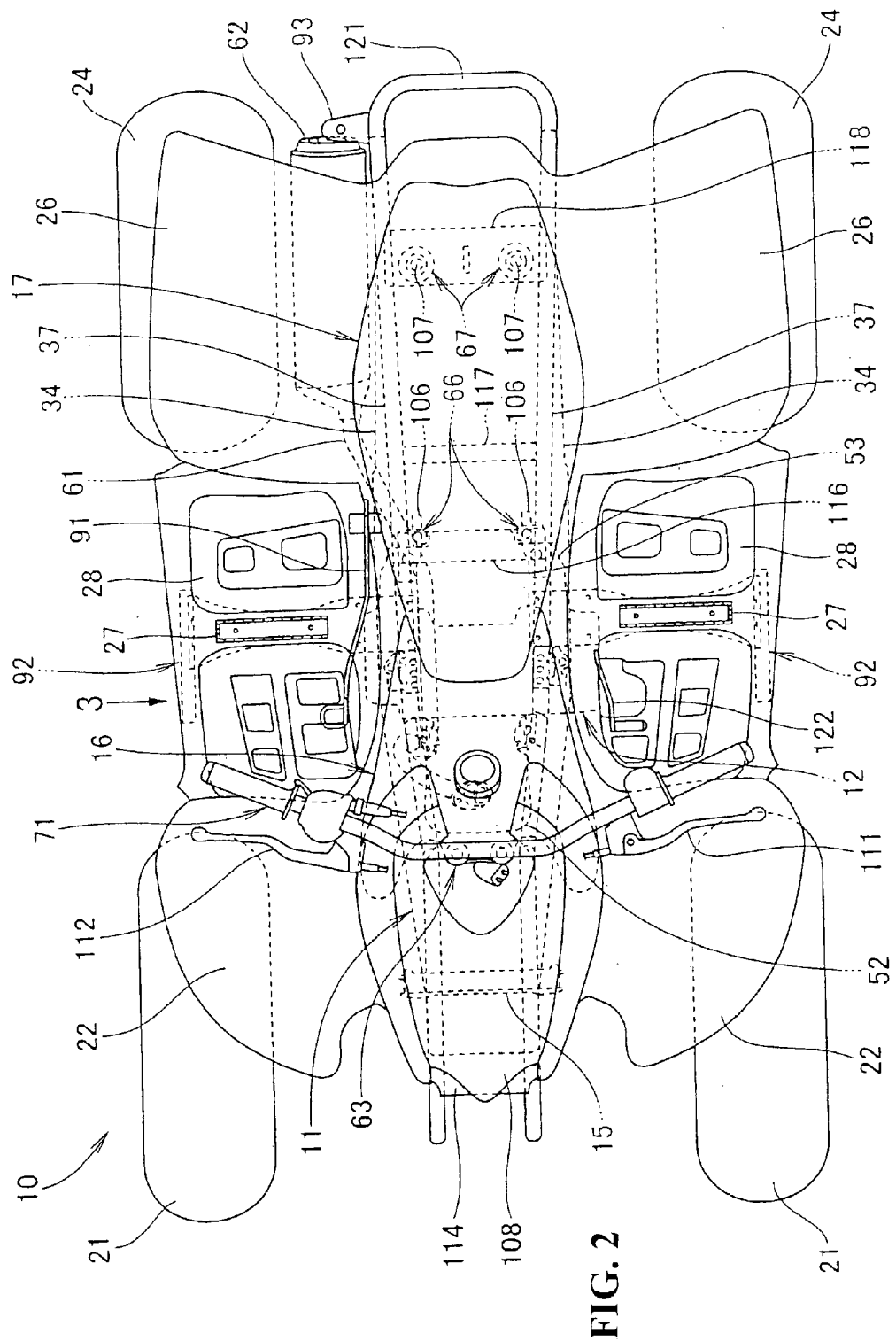
FIG. 2 is a plan view of the saddle-ride type vehicle according to the present invention.

FIG. 2 is a top view of the saddle-ride type vehicle according to the present invention. The fuel tank 16 has a front portion wider than the rear portion thereof as viewed from above and is provided with a front mounting portion 63 at the center of the front portion.

The seat 17 includes left and right hooks 106, 106 constituting front retaining portions 66 located on the bottom plate 105 (see FIG. 1) thereof, and left and right positioning projections 107, 107 constituting rear positioning portions 67.

A front cover 108 is disposed between the left and right front fenders 22, 22 so as to be integrally joined to one another.

The foot rests 27 are attached to left and right L-shaped foot brackets 92 through the foot boards 28, respectively, and are used for positioning the operator's feet thereon.

The handlebar 71 is provided on its left front side with a rear brake lever 111 to activate a rear wheel side drum brake 97 (see FIG. 1) and on its right front side with a front brake lever 112 to activate a front wheel side disk brake (not shown). In other words, the rear wheel drum brake 97 can be activated by both the brake pedal 91 and rear brake lever 111.

As illustrated in FIG. 2, the cross members 114 to 118 are provided in the body frame 11. A U-shaped cross pipe 121 is connected to each of the rear ends of the left and right upper rear frame 37. A change pedal is provided for shifting 133.

Figure 3:
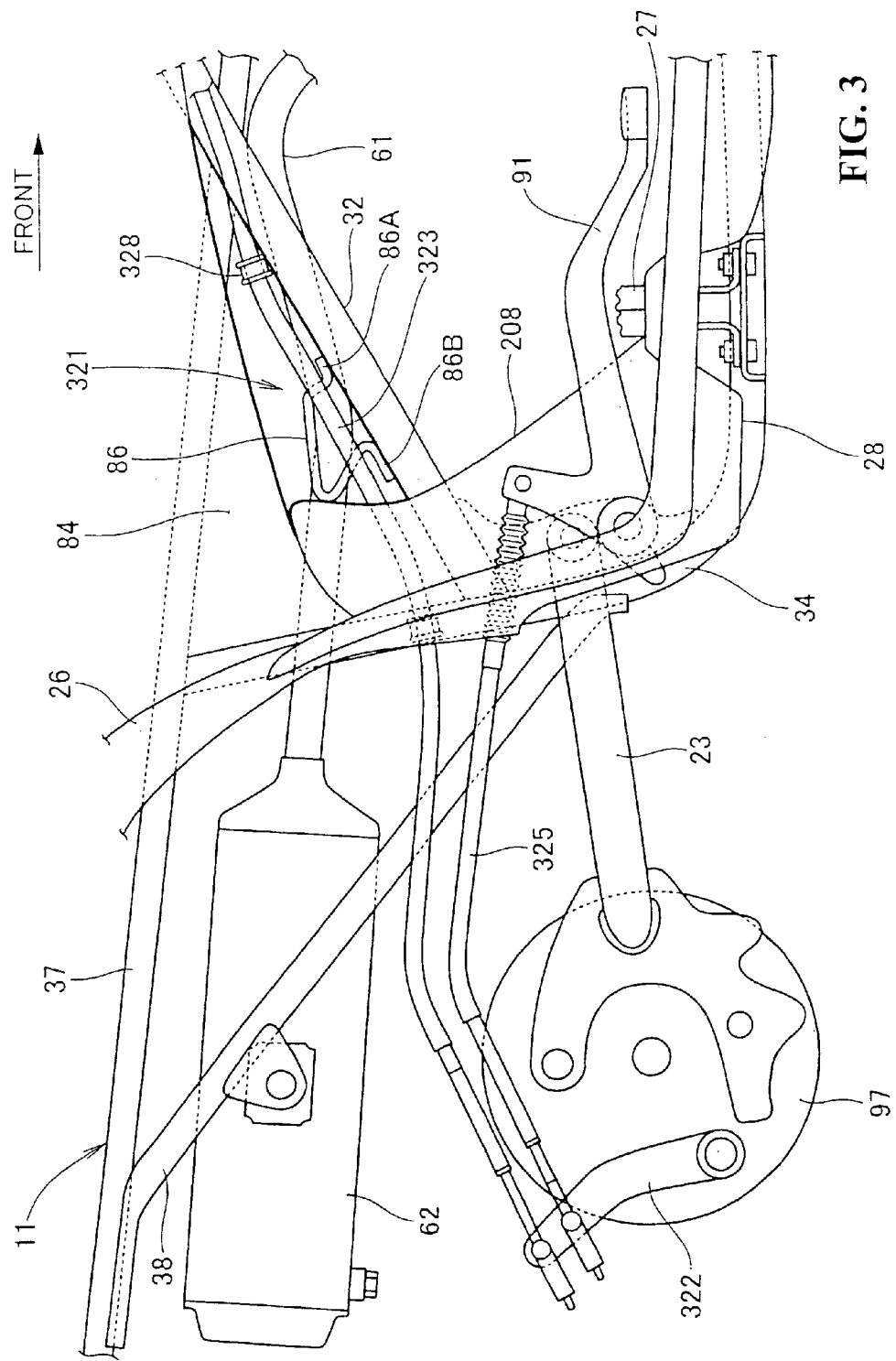
FIG. 3 is a view as viewed in the direction of arrow 3 of FIG. 2.

FIG. 3 is a view as viewed from arrow 3 (arrow "FRONT" in FIG. 3 denotes the front of the vehicle, which applies to the following). An almost-triangular opening 321 (an outlined portion indicated with bold lines) is surrounded by the side cover 84 with the upper slant frame 32 and a side plate 208 provided on the foot board 28. A guard member 86 which is made of a wire rod is attached onto the upper slant frame 32 so as to face the opening 321. This guard member 86 shields the outside (the front side) of the exhaust pipe 61 in the width direction of the vehicle. In addition, a first brake cable 323 extends from the rear brake lever 111 attached to the handlebar 71 (see FIG. 2) to the brake arm 322 attached to the rear wheel drum brake 97. The first brake cable 323 is disposed or retained along the outside of the guard member 86 in the width direction of the vehicle. Two extensions or secured portions 86A, 86B of the guard member 86 are adapted to undetachably secure the guard member 86 to the upper slant frame 32. A second brake cable 325 extends from the brake pedal 91 to the brake arm 322.

Figure 4:
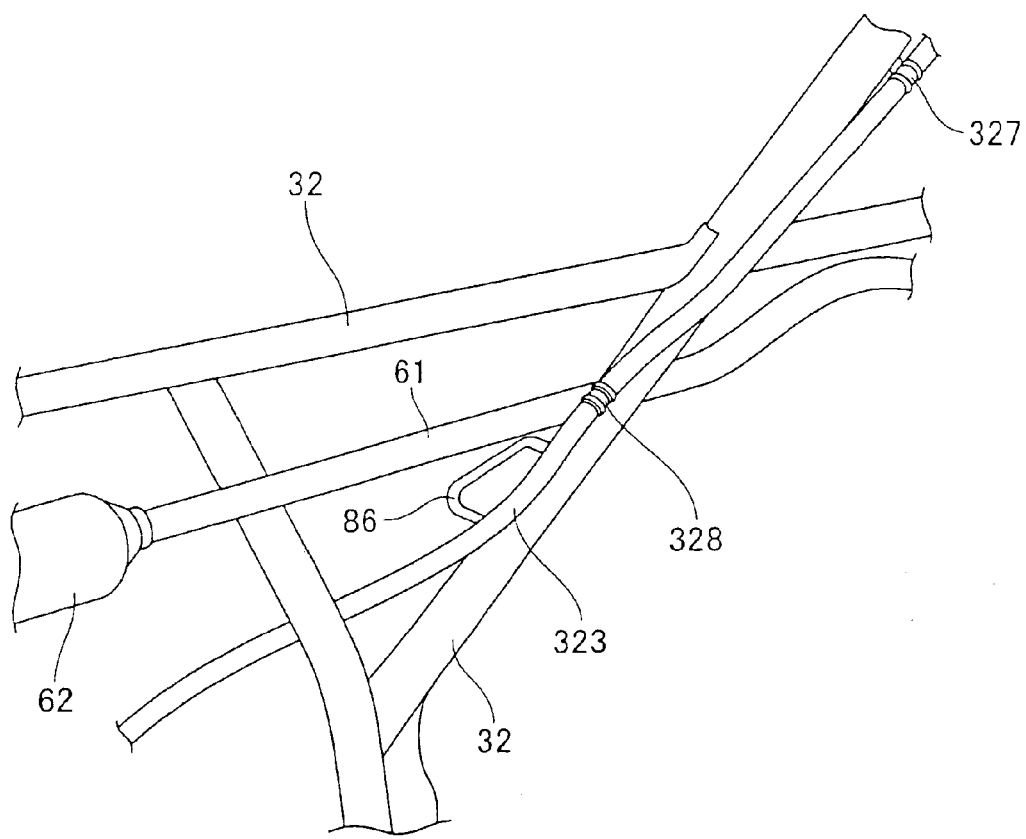
FIG. 4 is a perspective view illustrating a guard member and its peripheries according to the present invention.

FIG. 4 is a perspective view illustrating the guard member and its peripheries according to the invention. In FIG. 4, the guard member 86 which is attached to the upper slant frame 32 is disposed along the outside of the exhaust pipe 61 in the width direction of the vehicle. In addition, the brake cable 323 is disposed along the upper slant frame 32. Retainers 327 and 328 are provided for retaining the first brake cable 323 to the upper slant frame 32.

Figure 5:
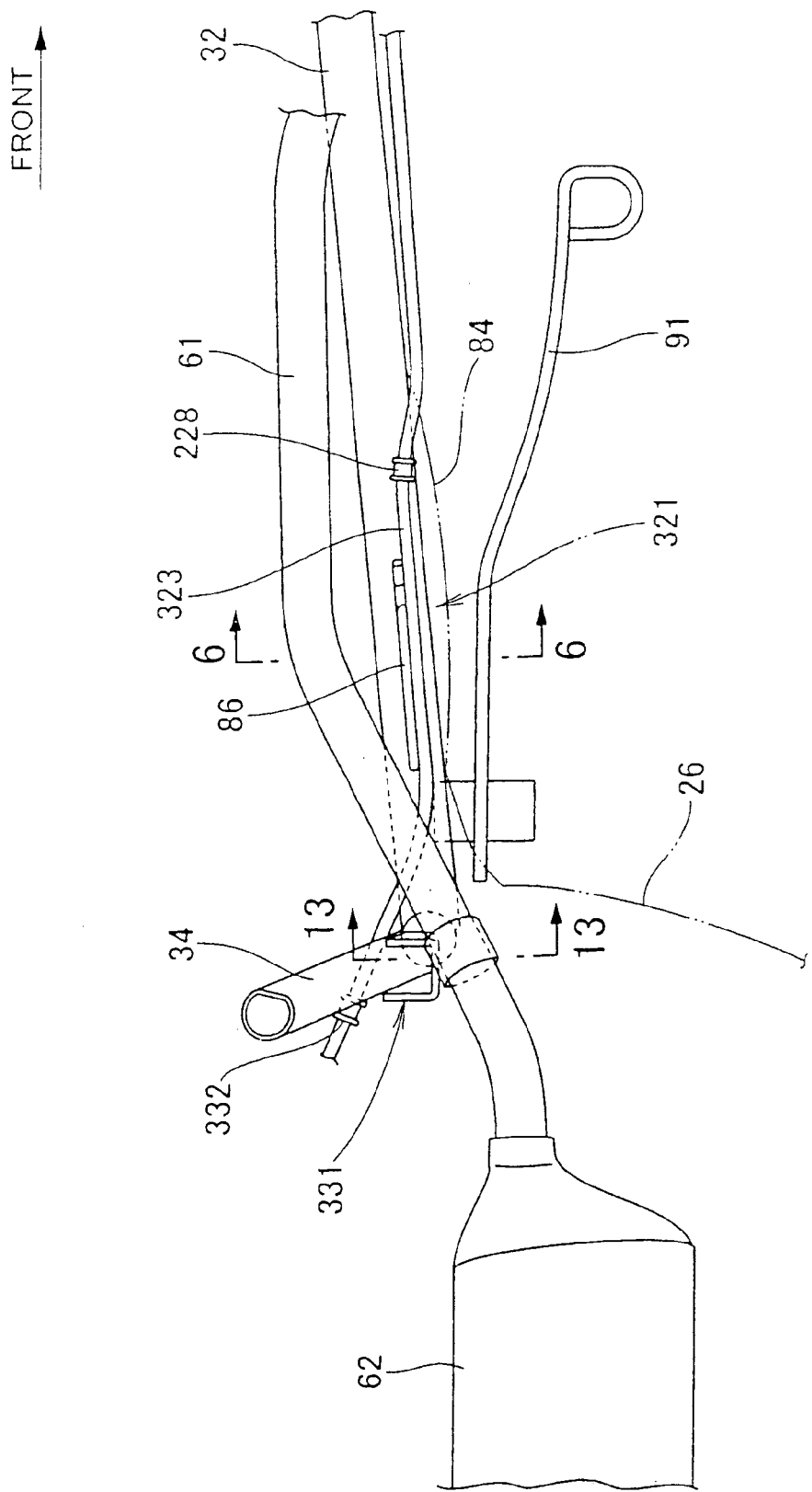
FIG. 5 is a plan view for explaining the mounting position of the guard member according to the present invention.

FIG. 5 is a plan view for explaining the attachment position of the guard member according to the invention. The exhaust pipe 61 extends from the front to rear of the vehicle substantially along, and on the inside (above in FIG. 5) of the upper slant frame 32 in the width direction of the vehicle. In addition, it is bent at a position in front of the rising lower main frame 34, toward the lateral outside of the vehicle body (downwardly in FIG. 5) and is retained at a location laterally outside the lower main frame 34 by means of an exhaust pipe retainer 331.

The first brake cable 323 extends from the front to rear of the vehicle substantially along the upper slant frame 32, and is secured to the upper slant frame 32 by means of a retainer 328 at a location on the front side of the guard member 86 in the width direction of the vehicle. In addition, the cable 323 is retained to and extends along the outside of the guard member 86 in the width direction of the vehicle, and is secured to the lower main arm 34 by means of a retainer 332.

The guard member 86 is located at a position slightly forward of an intersection between the upper slant frame 32 and the exhaust pipe 61, in the back-and-forth direction of the vehicle, as viewed from above. As shown in FIG. 3 as well, the intersection between the upper slant frame 32 and the exhaust pipe 61 as viewed from above is covered by the rear fender 26 and the side plate 208 from the lateral outside of the vehicle body, whereas the opening 321 is shielded by the guard member 86.

In this way, since the guard member 86 shields the outside of the exhaust pipe 61 in the width direction of the vehicle, the exhaust pipe 61 can be free from interference from the outside through the opening 321. In addition, the guard member 86 which is made of a cable rod is designed not to impede heat from being released through the opening 321. It is therefore possible to prevent heat generated from the engine 52 (see FIG. 1), the exhaust pipe 61, the muffler 62 and the like from collecting inside the vehicle body, which improves cooling performance.

Referring to FIGS. 3 and 5, the first brake cable 323 is retained to the outside of the guard member 86 in the width direction of the vehicle, so that it is possible to prevent the first cable 323 from coming into contact with the exhaust pipe 61 or from being affected by heat.

Figure 6:
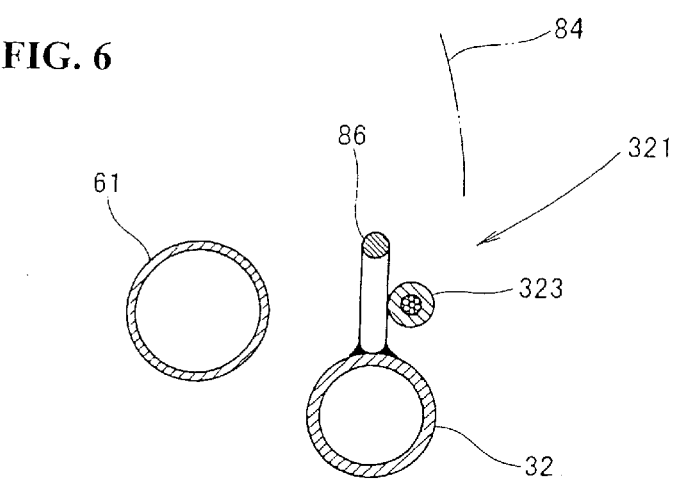
FIG. 6 is a cross-sectional view taken along line 6-6 of FIG. 5.

FIG. 6 is a cross-sectional view taken along line 6-6 of FIG. 5. In FIG. 6, the guard member 86 is fixedly attached to the top of the upper slant frame 32 to shield the exhaust pipe 61 which is otherwise exposed to the exterior through the opening 321. The first brake cable 323 is passed along the guard member 86 on a side opposite to the exhaust pipe 61. In addition, the guard member 86 is allowed to extend upright. However, the guard member 86 is not limited to this configuration. The guard member 86 may extend upwardly while bending inwardly or outwardly of the vehicle body.

Figure 7:
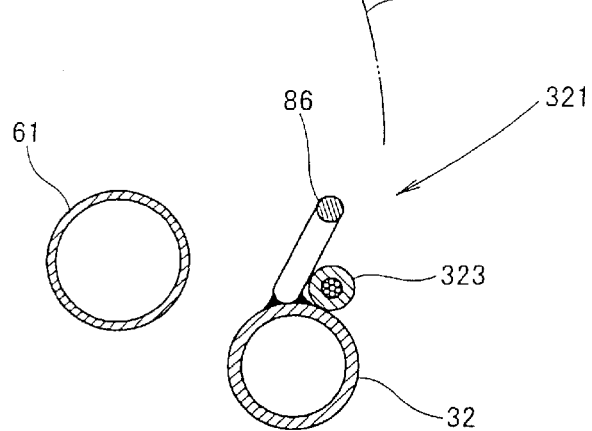
FIG. 7 is a cross-sectional view illustrating another embodiment of a method for retaining a brake cable by means of the guard member according to the present invention.

FIG. 7 is a cross-sectional view illustrating another embodiment of a method for retaining a brake cable with a guard member according to the present invention. In FIG. 7, a guard member 86 is attached at an angle to an upper slant frame 32 in such a way that the top of the guard member 86 is located at a position outwardly of the attachment portion of the guard member 86 to the upper slant frame 32 with respect to the vehicle body. In this state, the first brake cable 323 is retained by means of the guard member 86.

Alternatively, the guard member 86 may be attached at an angle in such a way that the top of the guard member 86 is located at a position inwardly of the attachment portion of the guard member 86 to the upper slant frame 32 with respect to the vehicle body.

Further alternatively, the guard member 86 may be bent progressively while being inclined toward the outside or inside of the vehicle body as described above.

Figure 8:
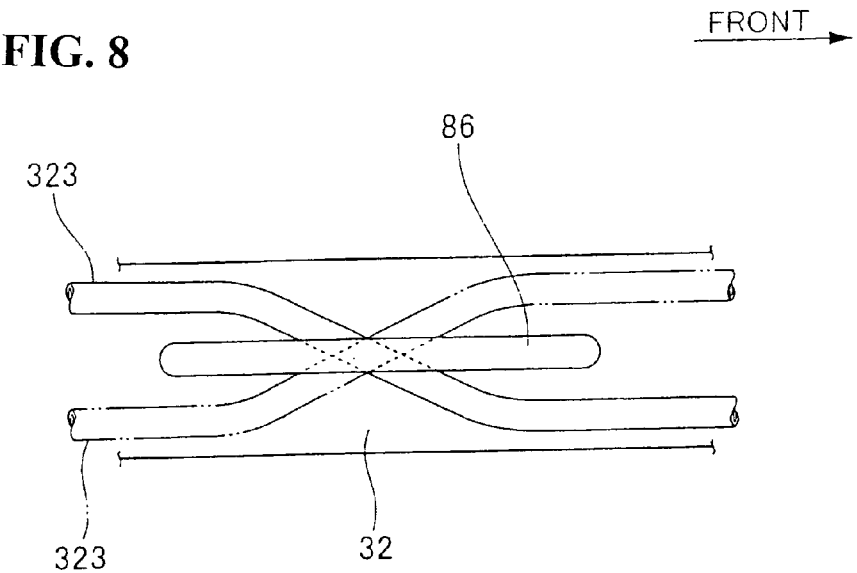
FIG. 8 is an essential plan view illustrating yet another embodiment of a method for retaining a brake cable by means of the guard member according to the present invention.

FIG. 8 is an essential plan view illustrating still another embodiment of a method for retaining a brake cable with a guard member according to the present invention. As indicated with solid lines or imaginary lines in FIG. 8, a first brake cable 323 may be retained by extending it between a guard member 86 and an upper slant frame 32.

Figure 9:
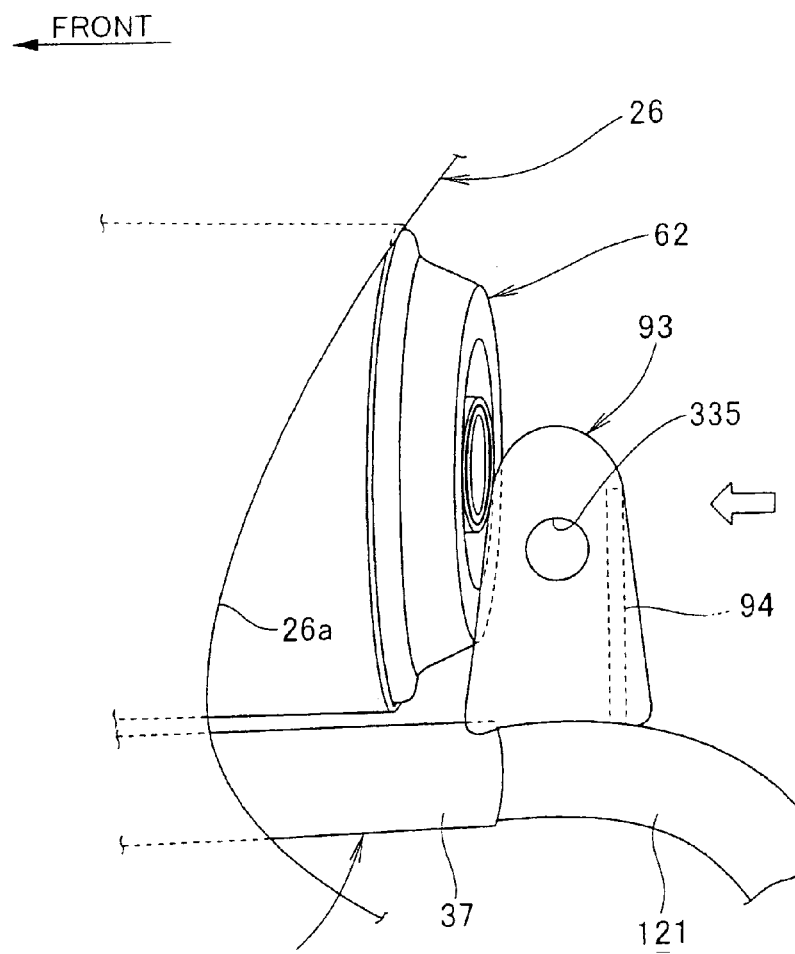
FIG. 9 is an essential plan view illustrating the rear portion of the saddle-ride type vehicle according to the prevent invention.

FIG. 9 is an essential plan view illustrating a rear portion of the saddle-ride type vehicle according to the present invention. The rear fender 26 may be reduced in size in order to improve the exterior appearance. In this case, it is necessary to prevent obstacles from entering the muffler 62 in the direction of a blank arrow, namely, from the rear of the vehicle, the muffler 62 projects rearwardly from the rear edge 26a of the rear fender 26. To meet the necessity, as shown in FIG. 9, a pole stay 93 for carrying a pole is attached to a rear portion of the body frame 11. More specifically, the pole stay is attached to the upper rear frame 37 and the cross pipe 121. A pole insertion hole 355 is bored in the pole stay 93 so as to insert the pole thereinto.

Figure 10:
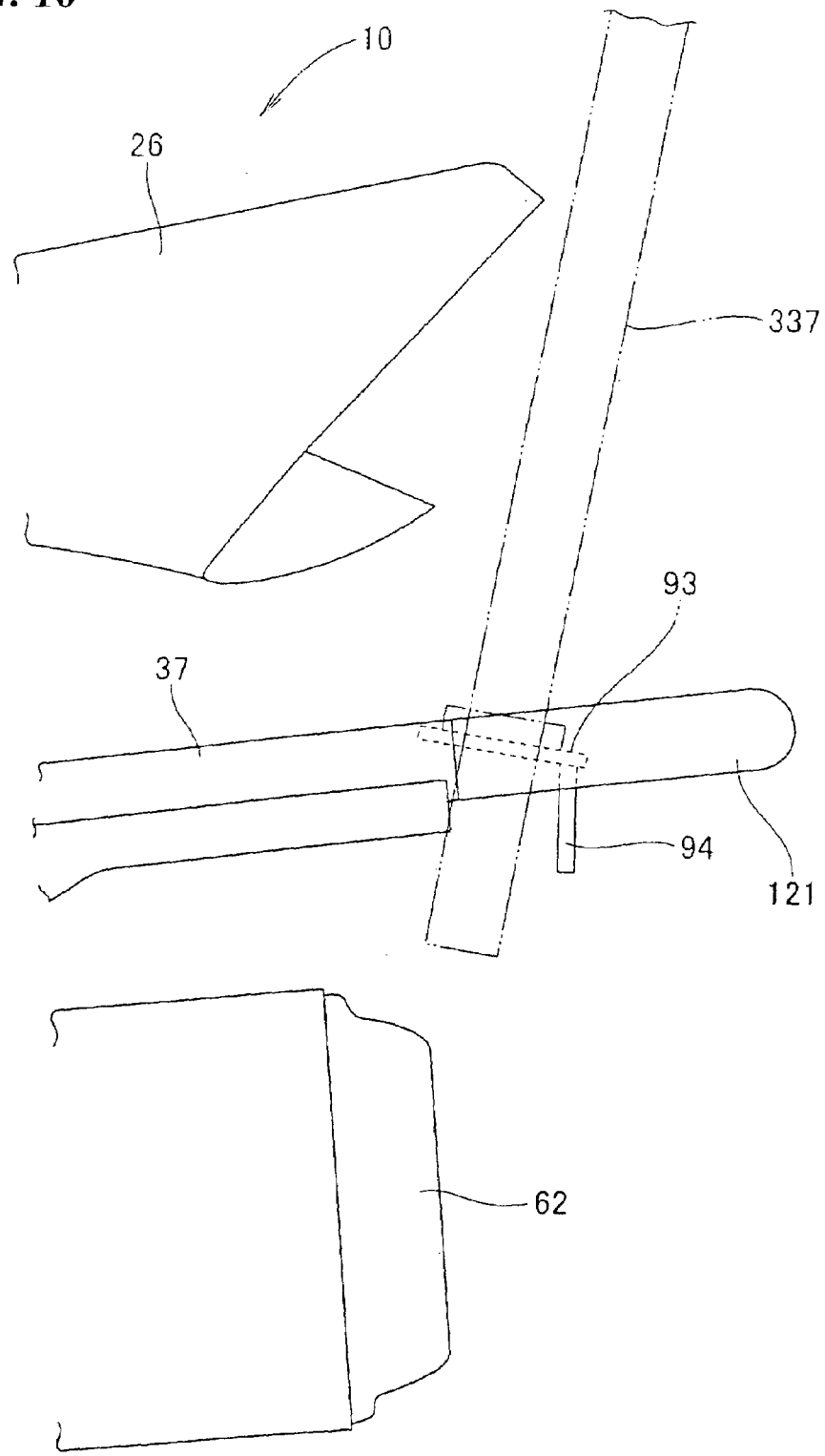
FIG. 10 is a side view for explaining a pole stay according to the present invention.

FIG. 10 is a side view illustrating the pole stay according to the present invention. The pole stay 93 serves to hold a pole 337 to which a flag is attached. The pole stay 93 serves as a guard preventing contact with the muffler 62.

The pole stay 93 has a reflector 94 attached thereto. The reflector 94 reflects light downwardly so as to allow another vehicle or a pedestrian to visually and easily recognize the presence of the saddle-ride type vehicle 10 from the rear of the vehicle.

Figure 11:
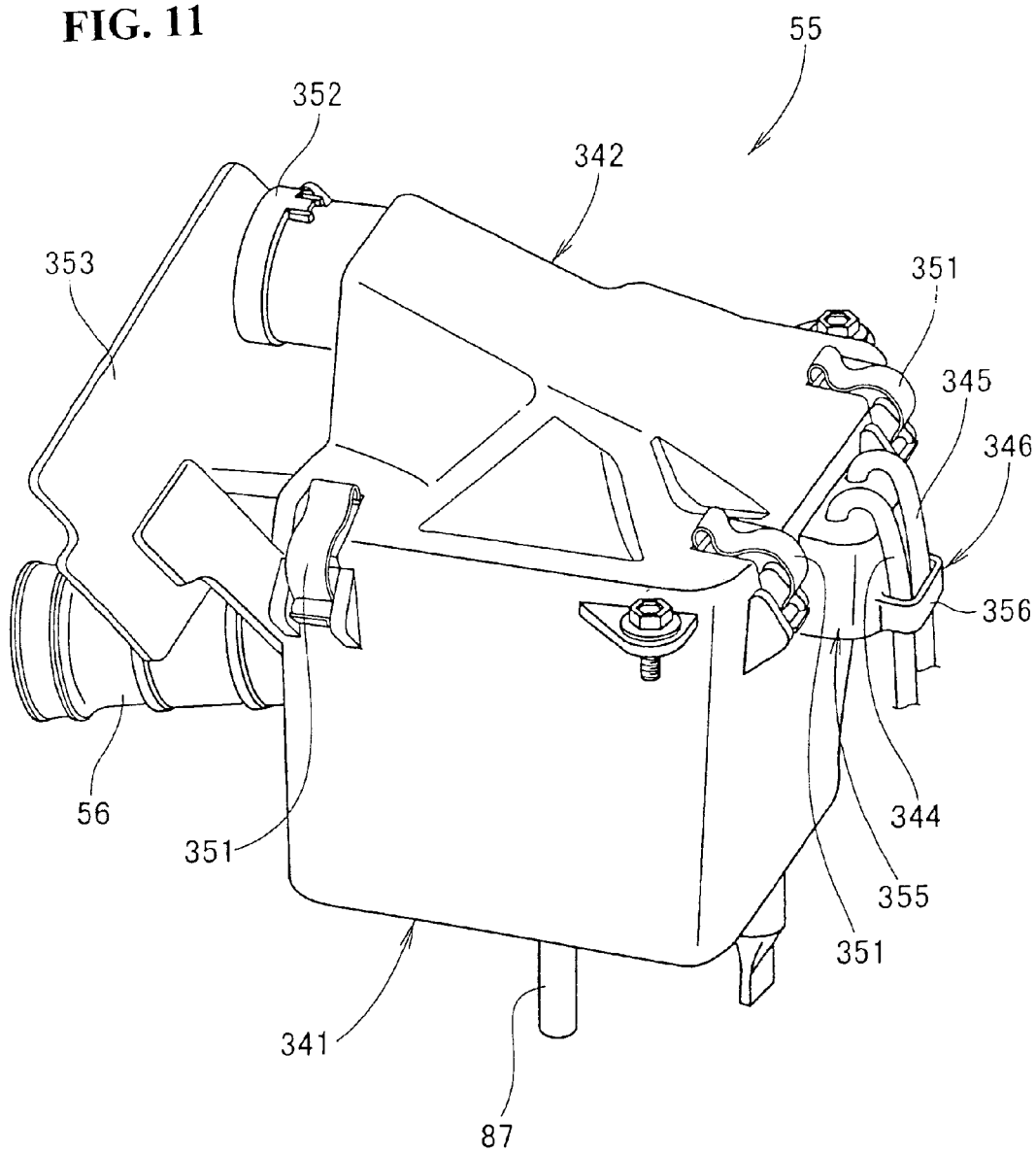
FIG. 11 is a perspective view of an air cleaner installed on the saddle-ride type vehicle according to the present invention.

FIG. 11 is a perspective view of the air cleaner equipped on the saddle-ride type vehicle according to the present invention. The air cleaner 55 includes an air cleaner case 341 and an air cleaner case cover 342 which closes the opening of the air cleaner case 341. The air cleaner case 341 is provided at its rear portion with a hose retainer 346 for retaining two hoses 344, 345 thereto.

A spring member 351 is provided for fastening the air cleaner case cover 342 to the air cleaner case 341. An intake port 352 is provided at the upper front portion of the air cleaner case cover 342 for introducing air into the air cleaner 55. A mud guard plate 353 is provided for shielding the intake port 352 so as to prevent muddy water or the like splashing from the road surface, from entering the intake port 352.

Figure 12:
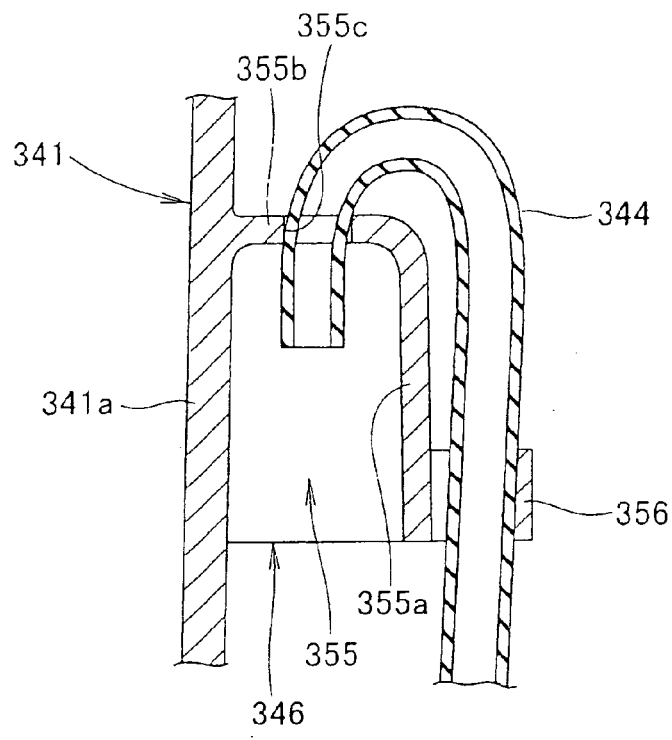
FIG. 12 is a cross-sectional view of a hose retaining portion according to the present invention.

FIG. 12 is a cross-sectional view of the hose retaining portion according to the present invention. The hose retaining portion 346 includes a chamber 355 provided integrally on the rear wall 341a of the air cleaner case 341, and a hose anchor 356 provided integrally on the rear wall 355a of the chamber 355.

The chamber 355 is open downwardly and is formed with two hose insertion holes 355c, 355c (only numeral 355c on the front side is shown) in the upper wall 355b thereof. The hoses 344, 345 (only numeral 344 on the front side is shown) pass through the hose anchor 356 from below toward above and the ends of the hoses 344, 345 are inserted into the hose insertion holes 355c, 355c, respectively, for retention.

The other end of the hose 344 is connected to the drum brake 97 (see FIG. 1) noted above, whereas the other end of the hose 345 is connected to the inside of the crankcase 88 (see FIG. 1), separately from the blow-by hose 87 (see FIG. 11).

Figure 13:
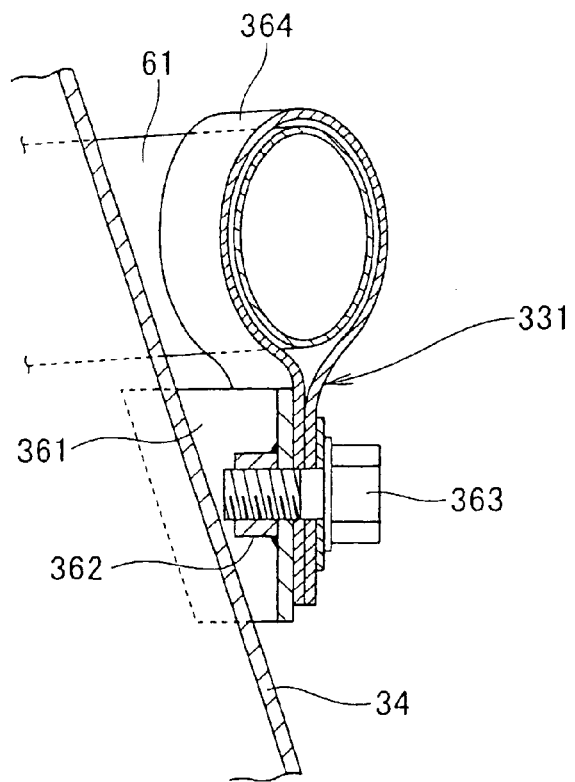
FIG. 13 is a cross-sectional view taken along line 13-13 of FIG. 5.

FIG. 13 is a cross-sectional view taken along line 13-13 of FIG. 5, illustrating a state in which the exhaust pipe 61 is held by the exhaust pipe retainer 331.

The exhaust pipe retainer 331 includes a mounting bracket 361 attached to the lower main frame 34, and a strip-shaped member 364. The strip-shaped member 364 is fastened to the mounting bracket 361 with a bolt 363 and a nut 362 attached to the mounting bracket 361, and is wound around the exhaust pipe 61 with a gap defined therebetween. The gap defined between the exhaust pipe 61 and the strip-shaped member 364 is designed to be cleared when the exhaust pipe 61 reaches a certain amount of expansion.

Figure 14:
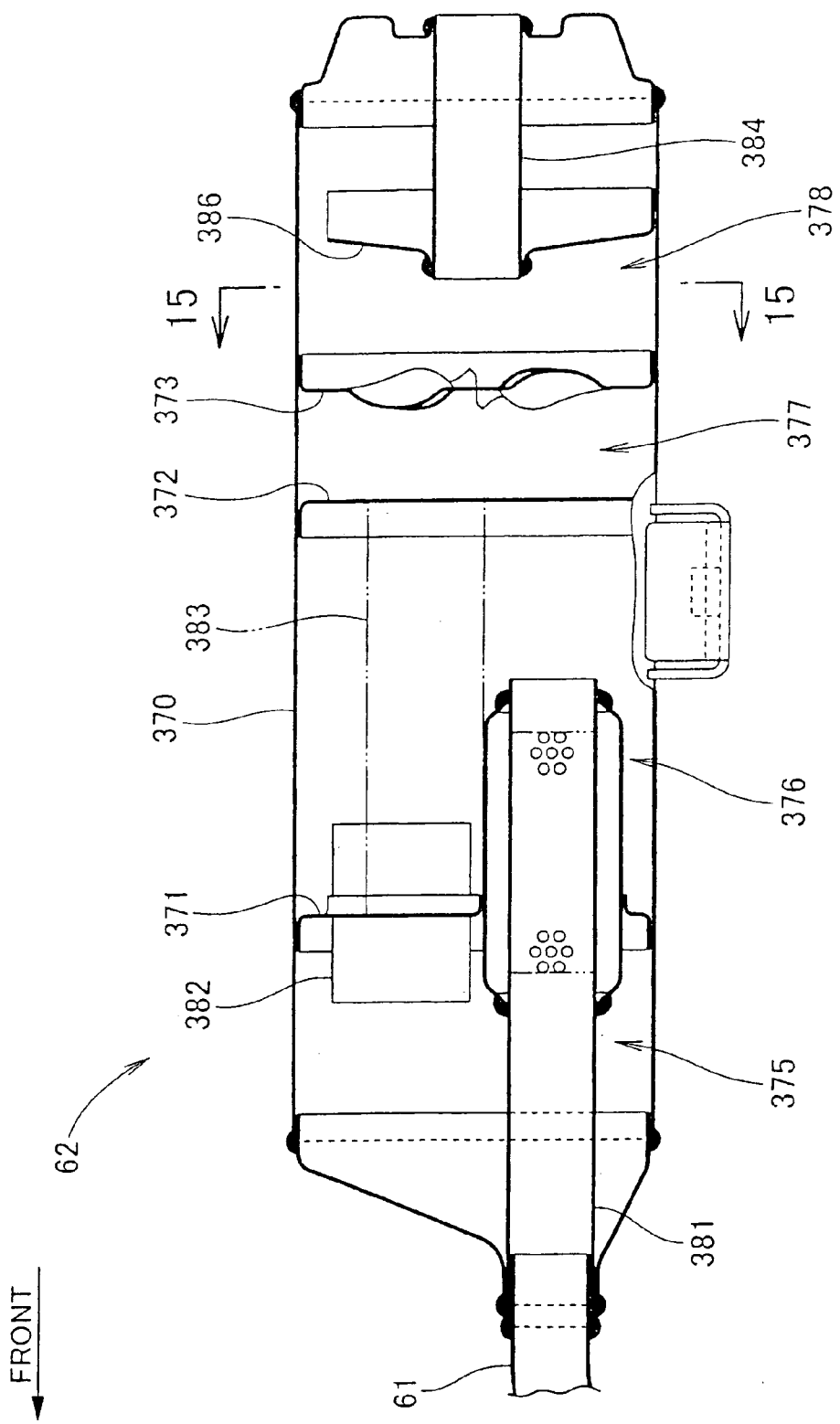
FIG. 14 is a cross-sectional view of a muffler according to the present invention.

FIG. 14 is a cross-sectional view of the muffler according to the present invention. The muffler 62 has a first partition wall 371, a second partition wall 372 and a spark arrestor 373, which are provided inside its cylinder 370, in order from the front to the rear. The spark arrestor 373 serves to prevent fire sparks from being discharged. The interior of the muffler 62 is partitioned into a first chamber 375 defined forward of the first partition wall 371, a second chamber 376 defined between the first partition wall 371 and the second partition wall 372, a third chamber 377 defined between the second partition wall 372 and the spark arrestor 373, and a fourth chamber 378 defined rearwardly of the spark arrestor 373.

A first pipe 381 extends from the exhaust pipe 61 to the second chamber 376, a second pipe 382 connects the first chamber 375 and the second chamber 376, and a third pipe 383 connects the first chamber 375 and the third chamber 377. In addition, a fourth pipe 384 lies in the fourth chamber 378, a support member 386 supports the end of the fourth pipe 384, and a fastening member 387 is used to fasten the muffler 62 to the body frame 11.

FIG. 15 is a cross-sectional view taken along line 15-15 of FIG. 14. In FIG. 15, the spark arrestor 373 is plug welded to the cylinder 370 at a plurality of locations on the left side with respect to the center thereof, that is, inward in the width direction of the vehicle.

Plug welded portions 391 are located at positions at angles θ1, θ2, and θ3 (θ3 <180°), respectively, from a vertical line 393.

Thus, the plug welded portions 391 cannot be seen from the lateral outside of the vehicle body, which improves the external appearance of the muffler 62.

The first partition wall 371, second partition wall 372 and support member 386 shown in FIG. 14 are members that are also plug welded as with the spark arrestor 373.

As describe above with reference to FIG. 3 (refer to FIGS. 4 to 6 as necessary), in the saddle-ride type vehicle 10 (see FIG. 1) in which the side cover 84 is disposed on the side of the body frame 11, the foot board 28 is disposed below the side cover 84, and the exhaust pipe 61 extending in the forward and rearward direction of the vehicle body is disposed inside the body frame 11. An embodiment of the present invention provides the exhaust pipe 61 which is disposed as viewed laterally so as to be exposed to the exterior through the opening 321 surrounded by the body frame 11, the side cover 84 and the foot board 28, and the guard member 86 is disposed at the opening 321.

Since the exhaust pipe 61 is disposed as viewed laterally so as to be exposed to the exterior through the opening 321 surrounded by the body frame 11, the side cover 84 and the foot board 28 and the guard member 86 is disposed at the opening 321. Thus, the guard member 86 can prevent the interference from the outside to the exhaust pipe 61 and heat radiation performance through the opening 321 can be enhanced.

Secondly, an embodiment of the present invention provides the guard member 86 as a member formed by bending a wire rod. Since the guard member 86 is a member formed by bending a wire rod, the heat radiation from the vehicle body is not obstructed, a simple structure is provided, cost is reduced, and assembling performance can be enhanced.

Thirdly, an embodiment of the present invention provides the guard member 86 as a member adapted to retain a cable or a hose thereto.

The guard member 86 can be adapted to easily retain the cable or the hose thereto so as to be away from the exhaust pipe 61. In addition, since the guard member 86 also serves as a retaining member for retaining a cable or a hose, an increase in the number of parts can be suppressed to reduce cost.

Fourthly, an embodiment of the present invention provides the guard member 86 as a member that prevents excessive approach to the exhaust pipe 61 through the opening 321.

Since the guard member 86 is a member that prevents an external object from approaching excessively to the exhaust pipe 61 through the opening 321, the guard member 86 can allow the exhaust pipe 61 to be free from interference from the exterior.

Fifthly, an embodiment of the present invention provides, in the opening 321, the guard member 86 that is fixedly attached to the body frame 11. More specifically, the upper slant frame 32 is provided with two fixing parts 86A, 86B located forwardly and rearwardly thereof in the extending direction of the exhaust pipe 61. In addition, the guard member 86 between the fixing parts 86A, 86B overlaps the exhaust pipe 61 as viewed laterally.

Since the guard member 86 can be fixedly secured to the body frame 11 with the two fixing parts 86A, 86B located forwardly and rearwardly of the guard member 86, and the guard member 86 between the fixing parts 86A, 86B is placed to overlap the exhaust pipe 61 as viewed laterally. Thus, the exhaust pipe 61 can be positively free from the interference.

Sixthly, an embodiment of the present invention provides the cable or the hose that is disposed on a side opposite to the exhaust pipe 61 with respect to the guard member 86.

Since the cable or the hose is disposed on a side opposite to the exhaust pipe 61 with respect to the guard member 86, the guard member 86 can prevent the cable or the hose from approaching the exhaust pipe 61.

Seventhly, an embodiment of the present invention provides the cable or the hose as the first brake cable 323 or brake hose for the rear wheel brake device, more specifically, the drum brake 97.

Since the cable or the hose is used with the drum brake 97, the first brake cable 323 or the brake cable is not liable to be affected by heat from the exhaust pipe 61, which can maintain the good operation of the drum brake 97.

Eighthly, an embodiment of the prevent invention provides the guard member 86 that is fixedly attached to the body frame 11, more specifically, the upper slant frame 32 for impossible detachment.

Since the guard member 86 is fixedly attached to the body frame 11 for impossible detachment, the guard member 86 can surely execute a guarding function.

In addition, in the present embodiment, the guard member 86 retains the first brake cable 323 thereto as shown in FIG. 3. However, the present invention is not limited to this embodiment. If a rear wheel is braked by means of a disk brake, a brake hose extending from the disk brake to a handlebar may be retained to the guard member 86.

The present invention is suitable to saddle-ride type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride type vehicle in which a side cover is disposed on a side of a body frame, a foot board is disposed below the side cover, and an exhaust pipe extends in the forward and rearward direction of a vehicle body is disposed inside the body frame comprising:

a guard member for positioning the exhaust pipe to be disposed, as viewed laterally, so as to be exposed to the exterior through an opening surrounded by the body frame, the side cover and the foot board, and the guard member is disposed at the opening, wherein, in the opening, the guard member is fixedly attached to the body frame with two fixing parts located forwardly and rearwardly thereof in the extending direction of the exhaust pipe, and the guard member between the fixing parts overlaps the exhaust pipe as viewed laterally.

2. The saddle-ride type vehicle according to claim 1, wherein the guard member is a member formed by bending a wire rod.

3. The saddle-ride type vehicle according to claim 1, wherein the guard member is a member adapted to easily retain a cable or a hose relative thereto.

4. The saddle-ride type vehicle according to claim 2, wherein the guard member is a member adapted to easily retain a cable or a hose relative thereto.

5. The saddle-ride type vehicle according to claim 1, wherein the guard member is a member for preventing excessive approach to the exhaust pipe through the opening.

6. The saddle-ride type vehicle according to claim 2, wherein the guard member is a member for preventing excessive approach to the exhaust pipe through the opening.

7. The saddle-ride type vehicle according to claim 3, wherein the guard member is a member for preventing excessive approach to the exhaust pipe through the opening.

8. The saddle-ride type vehicle according to claim 3, wherein the cable or the hose is disposed on a side opposite to the exhaust pipe with respect to the guard member.

9. The saddle-ride type vehicle according to claim 5, wherein the cable or the hose is disposed on a side opposite to the exhaust pipe with respect to the guard member.

10. The saddle-ride type vehicle according to claim 1, wherein the cable or the hose is disposed on a side opposite to the exhaust pipe with respect to the guard member.

11. The saddle-ride type vehicle according to claim 3, wherein the cable or the hose is used with a rear wheel brake device.

12. The saddle-ride type vehicle according to claim 5, wherein the cable or the hose is used with a rear wheel brake device.

13. The saddle-ride type vehicle according to claim 1, wherein the cable or the hose is used with a rear wheel brake device.

14. The saddle-ride type vehicle according to claim 1, wherein the guard member is fixedly attached to the body frame for impossible detachment.

15. A saddle-ride type vehicle comprising:
a side cover disposed on a side of a body frame;
a foot board disposed below the side cover;
an exhaust pipe extending in the forward and rearward direction of a vehicle body, said exhaust pipe being disposed inside the body frame; and
a guard member secured to the body frame for positioning the exhaust pipe to be exposed to the exterior through an opening surrounded by the body frame, the side cover and the foot board, and said guard member being disposed at the opening,
wherein, in the opening, the guard member is fixedly attached to the body frame with two fixing parts located forwardly and rearwardly thereof in the extending direction of the exhaust pipe, and the guard member between the fixing parts overlaps the exhaust pipe as viewed laterally.

16. The saddle-ride type vehicle according to claim 15, wherein the guard member is a member formed by bending a wire rod.

17. The saddle-ride type vehicle according to claim 15, wherein the guard member is a member adapted to easily retain a cable or a hose relative thereto.

18. A saddle-ride type vehicle comprising:
a side cover disposed on a side of a body frame;
a foot board disposed below the side cover;
an exhaust pipe extending in the forward and rearward direction of a vehicle body, said exhaust pipe being disposed inside the body frame; and
a guard member secured to the body frame for positioning the exhaust pipe to be exposed to the exterior through an opening surrounded by the body frame, the side cover and the foot board, and said guard member being disposed at the opening,
wherein the guard member is a member adapted to easily retain a cable or a hose relative thereto, and
wherein the cable or the hose is used with a rear wheel brake device.

* * * * *